United States Patent
Kim et al.

(10) Patent No.: US 9,341,759 B2
(45) Date of Patent: May 17, 2016

(54) METHOD FOR MANUFACTURING POLARIZER

(71) Applicant: Samsung Display Co., Ltd., Yongin, Gyeonggi-Do (KR)

(72) Inventors: TaeWoo Kim, Seoul (KR); Lei Xie, Suwon-si (KR); Minhyuck Kang, Seoul (KR); Myung Im Kim, Suwon-si (KR); Seung-won Park, Seoul (KR); Moongyu Lee, Suwon-si (KR); Sumi Lee, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 31 days.

(21) Appl. No.: 14/067,760

(22) Filed: Oct. 30, 2013

(65) Prior Publication Data
US 2014/0346139 A1    Nov. 27, 2014

(30) Foreign Application Priority Data

May 23, 2013 (KR) .................. 10-2013-0058594

(51) Int. Cl.
| | |
|---|---|
| G02B 5/30 | (2006.01) |
| H01L 21/308 | (2006.01) |
| B44C 1/22 | (2006.01) |
| C03C 15/00 | (2006.01) |
| C03C 25/68 | (2006.01) |
| C23F 1/00 | (2006.01) |
| B29D 11/00 | (2006.01) |

(52) U.S. Cl.
CPC .................................... *G02B 5/3058* (2013.01)

(58) Field of Classification Search
USPC ........................................................ 216/24
See application file for complete search history.

(56) References Cited

U.S. PATENT DOCUMENTS

| | | | | |
|---|---|---|---|---|
| 5,013,680 | A * | 5/1991 | Lowrey et al. ................. | 438/242 |
| 6,224,724 | B1 * | 5/2001 | Licata et al. ............. | 204/298.06 |
| 6,785,050 | B2 | 8/2004 | Lines et al. | |
| 7,842,337 | B2 | 11/2010 | Kim et al. | |
| 7,923,373 | B2 * | 4/2011 | Sandhu ......................... | 438/696 |
| 8,027,087 | B2 | 9/2011 | Perkins et al. | |
| 8,518,836 | B1 * | 8/2013 | Tsai et al. ..................... | 438/780 |
| 2001/0046791 | A1 * | 11/2001 | Subramanian et al. ....... | 438/786 |
| 2006/0221428 | A1 * | 10/2006 | Yamada ........................ | 359/245 |
| 2008/0122125 | A1 * | 5/2008 | Zhou ............................. | 257/797 |

(Continued)

FOREIGN PATENT DOCUMENTS

| | | |
|---|---|---|
| JP | 2009-234114 | 10/2009 |
| KR | 10-0609167 | 7/2006 |
| KR | 10-2007-0027083 | 3/2007 |
| KR | 10-2008-0024316 | 3/2008 |
| KR | 10-2011-0101893 | 9/2011 |

(Continued)

*Primary Examiner* — Thomas Pham
(74) *Attorney, Agent, or Firm* — Innovation Counsel LLP

(57) ABSTRACT

A method for manufacturing a polarizer may include forming a first barrier and a second barrier on a surface of a metal layer. The method may further include providing a copolymer layer between the first barrier and the second barrier. The method may further include processing the copolymer layer to form a processed polymer layer that includes first-polymer portions and second-polymer portions that are alternately disposed. The method may further include removing the second-polymer portions from the processed polymer layer to form polymer members that are spaced from each other. The method may further include etching the metal layer, using at least the polymer members, the first barrier, and the second barrier as a mask, to form a plurality of first-type wires and a plurality of second-type wires.

19 Claims, 21 Drawing Sheets

(56) References Cited

U.S. PATENT DOCUMENTS

2009/0052030 A1* 2/2009 Kaida et al. .................. 359/486
2010/0124826 A1* 5/2010 Millward ............ B81C 1/00031
                                                    438/780
2012/0168889 A1* 7/2012 Ooka ............................ 257/432
2012/0287507 A1   11/2012 Lee et al.

FOREIGN PATENT DOCUMENTS

| KR | 10-1109104 | 1/2012 |
| KR | 10-2012-0138349 | 12/2012 |
| KR | 10-2014-0007648 | 1/2014 |
| KR | 10-1346687 | 1/2014 |
| KR | 10-2014-0074427 | 6/2014 |

* cited by examiner

METHOD FOR MANUFACTURING POLARIZER

CROSS-REFERENCE TO RELATED APPLICATIONS

This U.S. non-provisional patent application claims priority and benefit under 35 U.S.C. §119 of Korean Patent Application No. 10-2013-0058594, filed on May 23, 2013, the entire contents of which are incorporated herein by reference.

BACKGROUND

The present invention relates to a method for manufacturing a polarizer, such as an in-cell reflective polarizer.

Generally, metallic wires may be arranged to selectively transmit or reflect polarized lights of electromagnetic waves. For example, an interval of a metallic wire array may be configured to be shorter than a wavelength of an incident electromagnetic wave, such that a polarized light component parallel to metallic wires is reflected and that a polarized light component perpendicular to the metallic wires is transmitted. Wire grid polarizers that include metallic wires may be used in display apparatuses.

SUMMARY

Embodiments of the present invention may be related to a method for manufacturing a polarizer that may be included a display device and may provide a satisfactory aperture ratio. Advantageously, the display device may provide satisfactory image brightness and/or may have satisfactory energy efficiency.

Embodiment of the invention may be related to a method for manufacturing a polarizer. The method may include forming a first barrier and a second barrier on a surface of a metal layer. The method may further include providing a copolymer layer between the first barrier and the second barrier. The method may further include processing the copolymer layer to form a processed polymer layer that includes first-polymer portions and second-polymer portions that are alternately disposed (between the first barrier and the second barrier). The method may further include removing the second-polymer portions from the processed polymer layer to form polymer members that are spaced from each other. The method may further include etching the metal layer, using at least the polymer members, the first barrier, and the second barrier as a mask, to form a plurality of first-type wires and a plurality of second-type wires.

The step of processing the copolymer layer may include thermally treating the copolymer layer.

The polymer members may be formed of poly styrene.

A width of each second-type wire of second-type wires may be in a range of a width of a first-type wire of the first-type wires to two times the width of the first-type wire of the first-type wires.

The width of each second-type wire of second-type wires may be in a range of 0 nm to 200 nm.

The polarizer may include a remaining portion of the first barrier. In an embodiment, a second-type wire of the second-type wires may include the remaining portion of the first barrier.

The first barrier may be taller than the copolymer layer in a direction that is perpendicular to the surface of the metal layer.

The method may include the following steps: forming a sacrificial layer on the metal layer; forming a bar on the metal layer by patterning the sacrificial layer; forming a barrier layer on the bar and on exposed portions of the metal layer; and performing anisotropic etching on the barrier layer to form the first barrier and the second barrier.

Each of an etch rate of the sacrificial layer and an etch rate of the barrier layer may be different from an etch rate of the metal layer regarding a same etchant.

An etch rate of the sacrificial layer may be lower than an etch rate of the barrier layer regarding a same etchant.

The sacrificial layer may be formed of silicon nitride, and the barrier layer may be formed of silicon oxide.

A sidewall of the bar may be at an angle with respect to the surface of the metal layer, and wherein the angle may be in a range of 85 degrees to 95 degrees.

The anisotropic etching may be performed in a direction that is substantially perpendicular to the surface of the metal layer.

The method may include the following steps: forming a first barrier layer on the metal layer; forming a mask layer on the first barrier layer; forming a sacrificial layer on the mask layer; forming a bar by patterning the sacrificial layer; forming a second barrier layer on the bar and on exposed portions of the mask layer; forming a first wall member and a second wall member by performing anisotropic etching on the second barrier layer; removing the bar; etching the mask layer, using the first wall member and a second wall member as a mask structure, to form a first mask member and a second mask member; and etching the second barrier layer, using the first mask member and the second mask member as a mask pattern, to form the first barrier and the second barrier.

The first barrier may include a remaining portion of the first mask member.

An etch rate of the hard mask layer may be lower than an etch rate of the second barrier layer regarding a same etchant.

The first barrier layer may be formed of silicon oxide, the mask layer may be formed of aluminum, and the second barrier layer may be formed of silicon nitride.

The method may include the following step: before the forming of the first barrier layer, forming a capping layer on the metal layer.

The capping layer may be formed of at least one of Ti and Mo.

The method may include the following steps: forming an etch stop layer on the metal layer; and forming the first barrier and the second barrier between two portions of the etch stop layer, wherein an etch rate of the etch stop layer is lower than an etch rate of the first barrier regarding a same etchant.

The method may include the following steps: forming a sacrificial layer such that the etch stop layer is disposed between the sacrificial layer and the metal layer; forming a bar by patterning the sacrificial layer; forming the first barrier or a wall member on a sidewall of the bar; and removing the bar.

The etch stop layer may be formed of at least one of chrome and indium tin oxide.

Embodiments of the may be related to a method for manufacturing a reflective polarizer. The method may include the following steps: forming a metal layer on a top surface of a transparent substrate; forming a sacrificial layer on the metal layer; forming bar patterns by patterning the sacrificial layer; forming a barrier layer on the bar patterns and the metal layer; forming barriers along sidewalls of the bar patterns and mutually separated with a certain interval by performing anisotropic etching on the barrier layer; removing the bar patterns; providing a copolymer layer formed of first and second polymers in an opening between the barriers; alternately arranging the first and second polymers by thermally treating the copolymer layer; forming a plurality of nano grid patterns formed of the first polymer and mutually separated with a certain interval between the barriers by removing the second polymer of the first and second polymers; and forming metallic nano wires by etching the metal layer by using the barriers and the nano grid patterns as a mask.

Embodiments of the may be related to a method for manufacturing a reflective polarizer. The method may include the following steps: forming a metal layer on a top surface of a transparent substrate; forming a first barrier layer on the metal layer; forming a hard mask on the first barrier layer; forming a sacrificial layer on the hard mask layer; forming bar patterns by patterning the sacrificial layer; forming a second barrier layer on the bar patterns and the hard mask layer; forming first barriers along sidewalls of the bar patterns and mutually separated with a certain interval by performing anisotropic etching on the second barrier layer; removing the bar patterns; forming second barriers by etching the hard mask layer by using the first barriers as a mask; forming third barriers by etching the second barrier layer by using the second barriers as a mask; providing a copolymer layer formed of first and second polymers in an opening between the third barriers; alternately arranging the first and second polymers by thermally treating the copolymer layer; forming a plurality of nano grid patterns formed of the first polymer and mutually separated with a certain interval between the third barriers by removing the second polymer of the first and second polymers; and forming metallic nano wires by etching the metal layer by using the third barriers and the nano grid patterns as a mask.

Embodiments of the invention may be related to a method for manufacturing an in-cell reflective polarizer formed in a display panel that includes a display area and a non-display area. The method may include the following steps: forming a metal layer on a top surface of a transparent substrate; forming an etch stop layer on the metal layer; corresponding to the non-display area; forming a sacrificial layer on the etch stop layer and the metal layer; forming bar patterns by patterning the sacrificial layer; forming a barrier layer on the bar patterns and the metal layer; forming barriers along sidewalls of the bar patterns and mutually separated with an interval by performing anisotropic etching on the barrier layer; removing the bar patterns; providing a copolymer layer formed of first and second polymers in an opening between the barriers; alternately arranging the first and second polymers by thermally treating the copolymer layer; forming a plurality of nano grid patterns formed of the first polymer and mutually separated with a certain interval between the barriers by removing the second polymer of the first and second polymers; and forming metallic nano wires in the display area by etching the metal layer by using the barriers and the nano grid patterns as a mask.

DETAILED DESCRIPTION OF EMBODIMENTS

Figure 1:
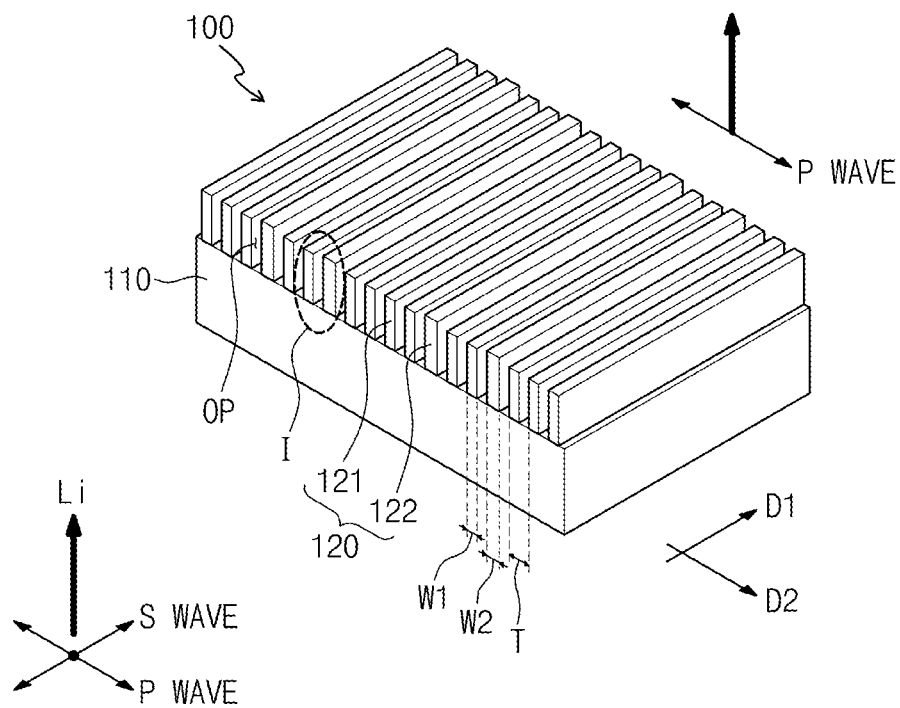
FIG. 1 is a perspective view illustrating a reflective polarizer according to an embodiment of the present invention.

Some embodiments of the invention are shown in the drawings and described in detail. The embodiments are for illustrating the invention and are not to limit the invention. All modifications, equivalents, and substitutes of the embodiments are included in the spirit and the scope of the invention.

In the drawings and the description, like reference numerals may designate analogous or identical elements.

In the drawings, sizes of structures may be enlarged than they actually are for providing clarity of the embodiments of the invention.

Although the terms "first", "second", etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer, or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms "first", "second", etc. may also be used herein to differentiate different categories of elements. For conciseness, the terms "first", "second", etc. may represent "first-type (or first-category)", "second-type (or second-category)", etc., respectively. Singular expressions may include plural expressions.

In the specification, terms such as "comprise" or "have" are used to indicate features, numbers, steps, operations, elements, components, and/or combinations thereof as being present but not to exclude possibility of the existence or the addition of one or more other features, numbers, steps, operations, elements, components, and/or combinations thereof.

In the specification, if a first part, such as a layer, a film, an area, or a plate, is "on" a second part, the first part may be "directly on" the second part without any intended intervening part, or at least an intervening part may be disposed between the first part and the second part.

Figure 2:
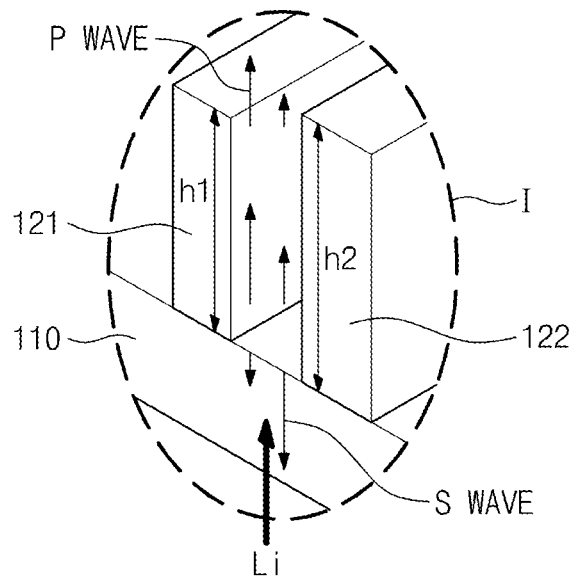
FIG. 2 is a partial enlarged view illustrating a part shown in FIG. 1 according to an embodiment of the present invention.

FIG. 1 is a perspective view illustrating a polarizer 100, e.g., a reflective polarizer 100, according to an embodiment of the embodiments of the invention. FIG. 2 is an enlarged view illustrating a part I shown in FIG. 1 according to an embodiment of the embodiments of the invention.

Referring to FIGS. 1 and 2, the reflective polarizer 100 includes a transparent substrate 110 and a plurality of metallic nano wires 120 provided on the transparent substrate 110.

The transparent substrate 110 may be formed of a light transmitting material. For example, the transparent substrate 110 may be a silicon substrate. The transparent substrate 110 may have a tetragonal shape. The metallic nano wires 120 may extend in a first direction D1. The first direction D1 may be substantially parallel to two edges of the transparent substrate 110. The metallic nano wires 120 may be separated in a second direction D2 that is substantially orthogonal to the first direction D1 and may be mutually parallel.

The reflective polarizer 100 may polarize incident light Li using the metallic nano wires 120 when the incident light Li is provided to the reflective polarizer 100. In the incident light Li, an S wave that is a component parallel to an extension direction (i.e., the first direction D1) of the metallic nano wires 120 may be reflected due to metallic properties of the metallic nano wires 120, and a P wave that is a component orthogonal to the extension direction of the metallic nano wires 120 may be transmitted.

As illustrated in FIG. 1, an interval of an arrangement of the metallic nano wires 120 is designated as "T". If a wavelength of the incident light Li is shorter than the arrangement interval T, reflection and transmission may occur depending on orientations of components of the incident light Li.

The metallic nano wires 120 may include a plurality of first-type metallic nano wires 121 (or first metallic nano wires 121, for conciseness) and a plurality of second-type metallic nano wires 122 (or second metallic nano wires 122, for conciseness). At least one first metallic nano wire 121 is disposed between two mutually adjacent (and immediately neighboring) second metallic nano wires 122. A second metallic nano wire 122 has a width that is larger than a width of a first metallic nano wire 121; the second metallic nano wire 122 has a height that is larger than a height of the first metallic nano wire 121. As an example, if a width of the first metallic nano wire 121 is W1 and if a width of the second metallic nano wire 122 is W2, the width W2 may be larger than the width W1 and may be less than or equal to 2×W1.

In an embodiment, the reflective polarizer 100 may operate in a visible light area. A width W1 of a first metallic nano wire 121 may be in a range of about 0 nm to about 100 nm. In an embodiment, a plurality of first metallic nano wires may have a same width W1. In an embodiment, 0 nm<W1<100 nm. A width W2 of a second metallic nano wire 122 may be in a range of about 80 nm to about 200 nm. In an embodiment, a plurality of second metallic nano wires may have a same width W2. In an embodiment, 80 nm<W2<200 nm.

A height h1 of a first metallic nano wire 121 may be at least about three times a width W1 of the first metallic nano wire 121. In an embodiment, a plurality of first metallic nano wires 121 may have a same height h1. A height h2 of a second metallic nano wire 122 may be at least about three times a width W2 of the second metallic nano wire 122. In an embodiment, a plurality of second metallic nano wires 122 may have a same height h2.

In the reflective polarizer 100, the number of the second metallic nano wires 122 may be equal to or less than the number of the first metallic nano wires 121. The arrangement interval of the second metallic nano wires 122 may be equal to or greater than that of the first metallic nano wires 121.

FIGS. 3A to 3L are views illustrating a process of manufacturing the reflective polarizer 100 illustrated in FIG. 1 according to an embodiment of the present invention.

Figure 3A:
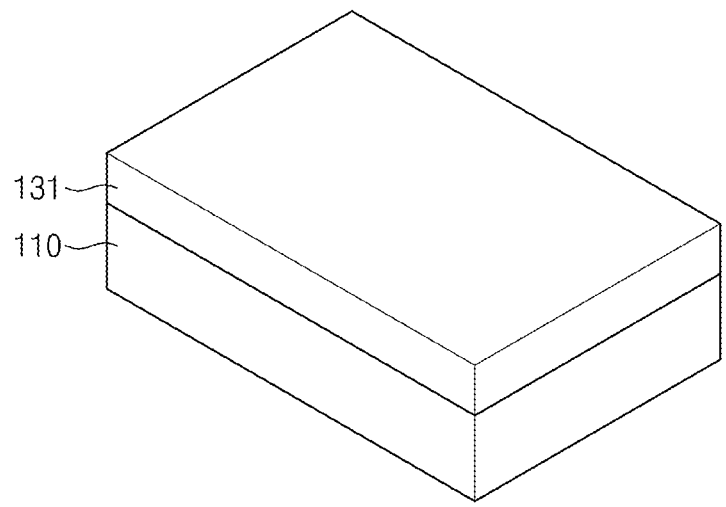
FIGS. 3A to 3L are perspective views illustrating a process of manufacturing the reflective polarizer illustrated in FIG. 1 according to an embodiment of the present invention.

Referring to FIG. 3A, a metal layer 131 is formed on a top surface of the transparent substrate 110. As an example, the metal layer 131 may be formed of aluminum (Al). A height of the metal layer 131 may be determined by considering a height of the metallic nano wires 120 (refer to FIG. 1) to be formed.

Figure 3B:
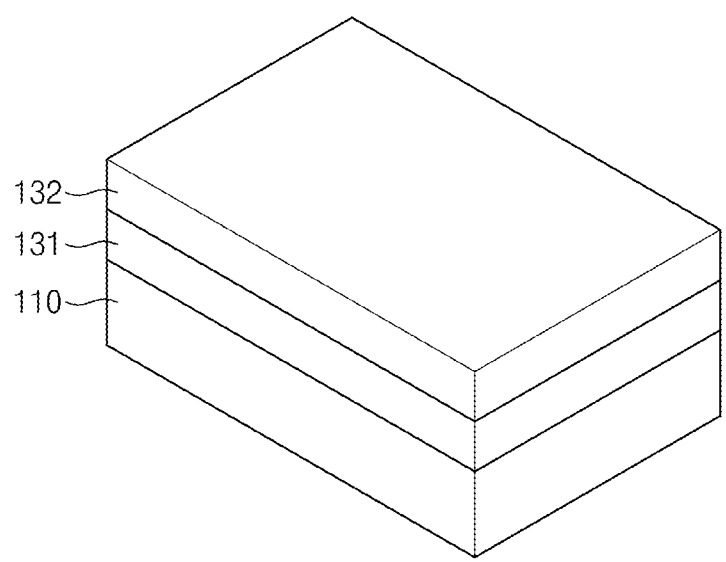
Figure 3C:
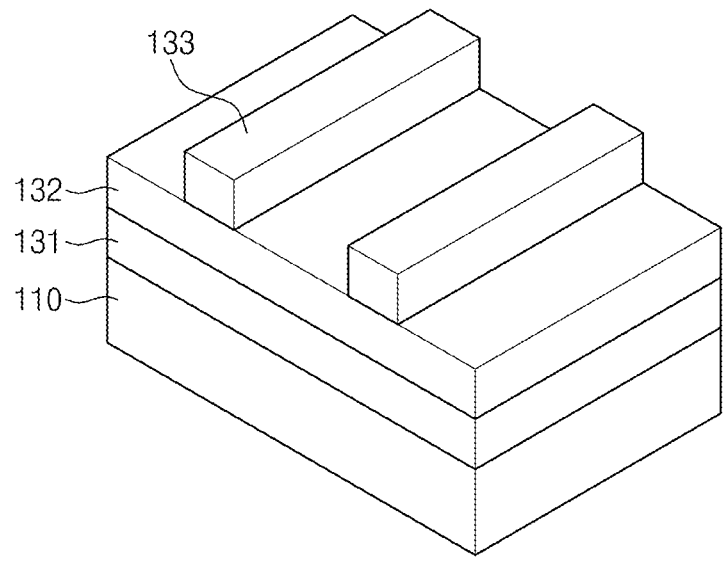

As shown in FIG. 3B, a sacrificial layer 132 is formed on the metal layer 131 to have a certain thickness. Referring to FIG. 3C, a photo mask 133 is formed on the sacrificial layer 132. As an example, the photo mask 133 may extend in a direction parallel to two edges among four edges of the transparent substrate 110, the two edges being parallel to each other.

Figure 3D:
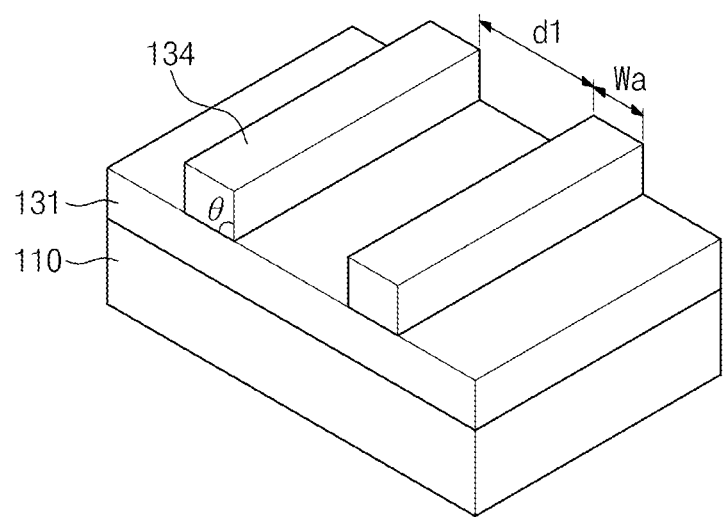

Referring to FIG. 3D, bar patterns 134 are formed by dry etching and removing portions of the sacrificial layer 132 that are not covered by the photo mask 133. After the etching and after the photo mask 133 has been removed, as shown in FIG. 3D, only the bar patterns 134 remain on the metal layer 131.

Respective widths Wa of the bar patterns 134 may be adjusted by configuring a width of the photo mask 133. Inclinations θ of sidewalls of the respective bar patterns 134 with respect to a top surface of the metal layer 131 may be in a range from about 85 to about 95 degrees. The widths Wa of the respective bar patterns 134 may be smaller than a distance d1 between two mutually adjacent (and immediately neighboring) bar patterns 134.

The widths Wa of the respective bar patterns 134 and the distance d1 between the bar patterns 134 may be determined based on the number of the first metallic nano wires 121 (refer to FIG. 1) to be provided between the second metallic nano wires 122 (refer to FIG. 1) and the intended width W1 of the first metallic nano wires 121.

Figure 3E:
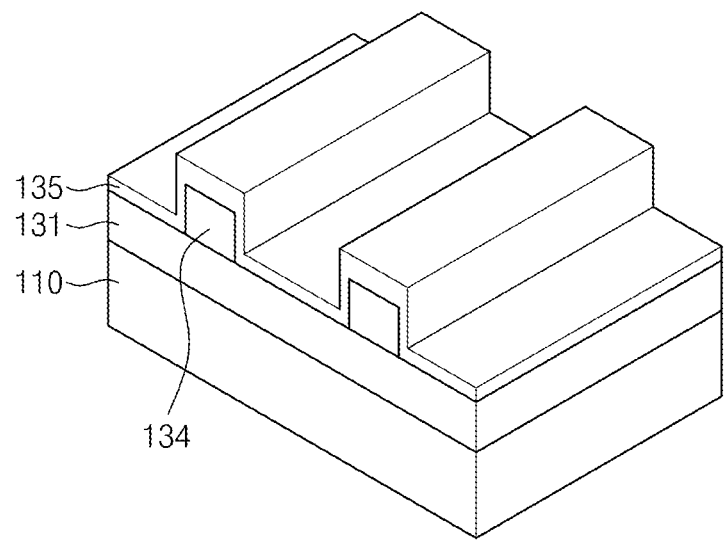
Figure 3F:
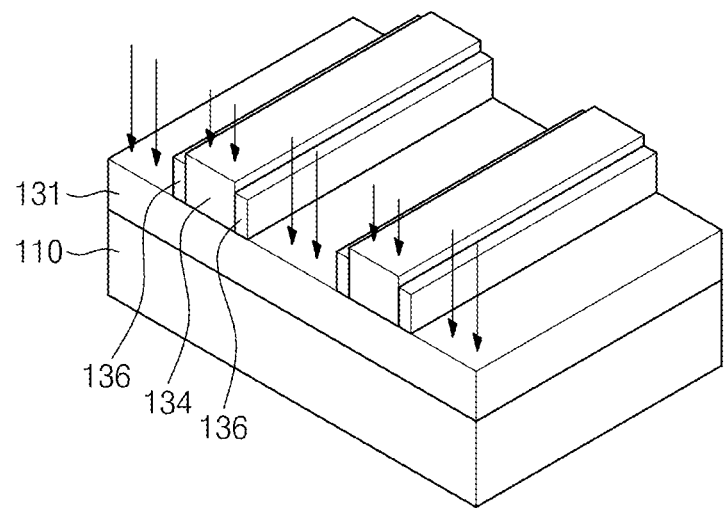

Referring to FIG. 3E, a barrier layer 135 is formed on the metal layer 131 to cover the bar patterns 134. After anisotropic etching is performed on the barrier layer 135, as shown in FIG. 3F, barriers 136 are formed along the sidewalls of the bar patterns 134 and are mutually separated with a certain interval.

The anisotropic etching may be performed in a direction substantially perpendicular to the top surface of the transparent substrate 110. Accordingly, portions of the barrier layer 135 parallel to the top surface of the transparent substrate 110 may be substantially removed by the anisotropic etching, and portions of the barrier layer 135 perpendicular to the top surface of the transparent substrate 110 may remain after the anisotropic etching.

Accordingly, the barriers 136 may be formed along the sidewalls of the bar patterns 134.

In an etchant used for the anisotropic etching, an etch rate of the material of the sacrificial layer 132 may be substantially lower than an etch rate of the material of the barrier layer 135. The etch rate of the material of the sacrificial layer 132 may be no more than a half of the etch rate of the material of the barrier layer 135. In an embodiment, the sacrificial layer 132 may be formed of silicon nitride, and the barrier layer 135 may be formed of silicon oxide.

During the anisotropic etching performed on the barrier layer 135, the bar patterns 134 (formed from the sacrificial layer 132) may not be substantially etched but may substantially remain.

Figure 3G:
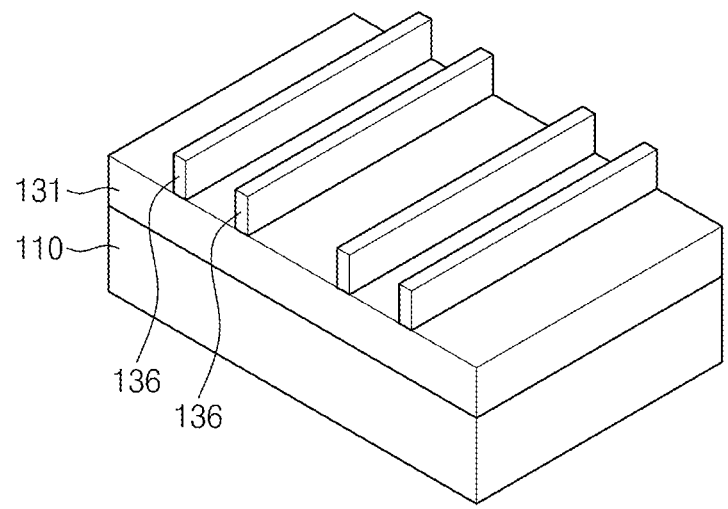

Subsequently, the bar patterns 134 may be etched and removed. As a result, as shown in FIG. 3G, only the barriers 136, mutually separated with a certain interval, may remain on the metal layer 131. In an embodiment, each of the barriers 136 may have a width that is in a range from about 80 nm to about 200 nm.

The sacrificial layer 132 and the barrier layer 135 may be formed of materials having etching characteristics (e.g., etch rates) that are different from etching characteristics of the metal layer 131. The metal layer 131 may not be substantially etched when the bar patterns 134 and the barrier layer 135 are etched.

Figure 3H:
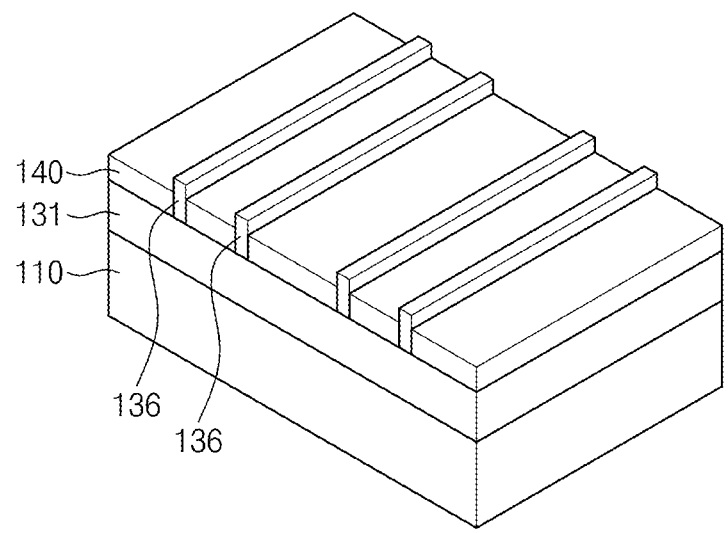

Referring to FIG. 3H, spaces between the barriers 136 are filled with a copolymer layer 140. The copolymer layer 140 may be formed to have a smaller height than the height of the barriers 136. The copolymer layer 140 may include a first-type polymer material and a second-type polymer material that are irregularly mixed in chaotic directions. The first polymer material may include poly styrene (PS); the second polymer material may include poly methylmethacrylate (PMMA).

Figure 3I:
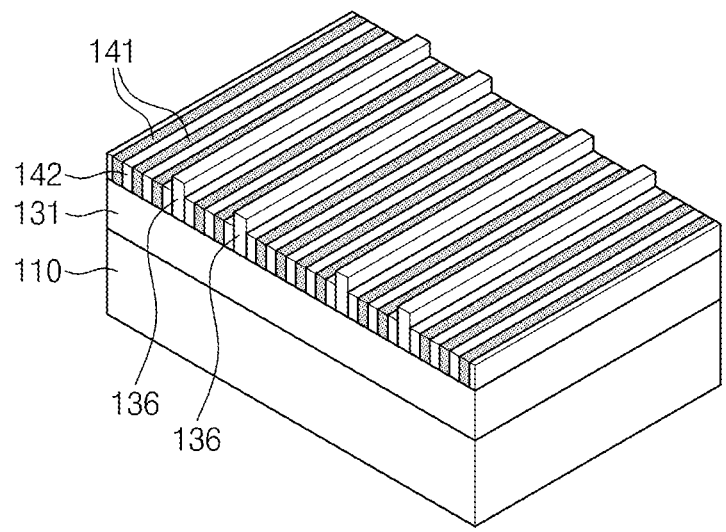

After the copolymer layer 140 has been thermally treated, as shown in FIG. 3I, the copolymer layer 140 are phase-separated into first-type polymer portions 141 and second-type polymer portions 142. Particularly, some first-type polymer portions 141 and some second-type polymer portions 142 may be alternately arranged between each pair of two barriers 136.

Figure 3J:
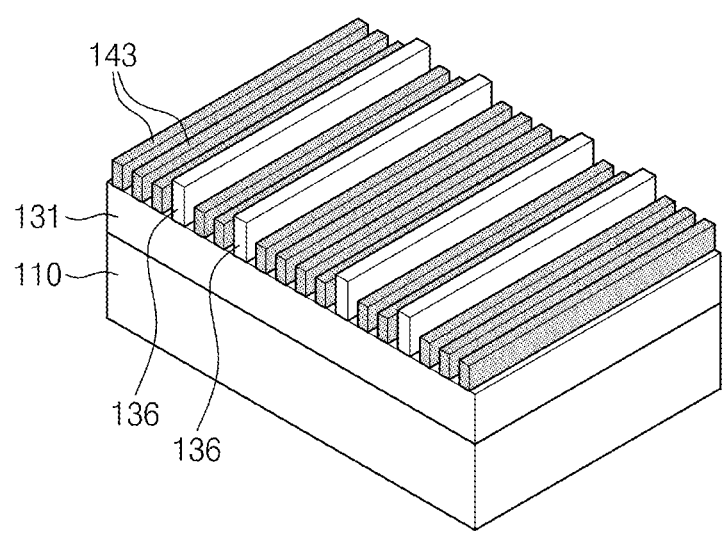

Subsequently, the first-type polymer portions 141 or the second-type polymer portions 142 are removed, and the remaining polymer portions (which are separated with a certain interval) form nano grid patterns 143 that are spaced from each other, as shown in FIG. 3J. As an example, the second-type polymer portions 142 (e.g., formed of PMMA) may be removed, and the first-type polymer portions 141 (e.g., formed of PS) may form the nano grid patterns 143.

Subsequently, the metal layer 131 is etched using the nano grid patterns 143 and the barriers 136 as a mask. As a result, as shown in FIG. 3K, metallic nano wires 121 and 122 are arranged in the first direction D1 and are provided on the transparent substrate 110.

Figure 3K:
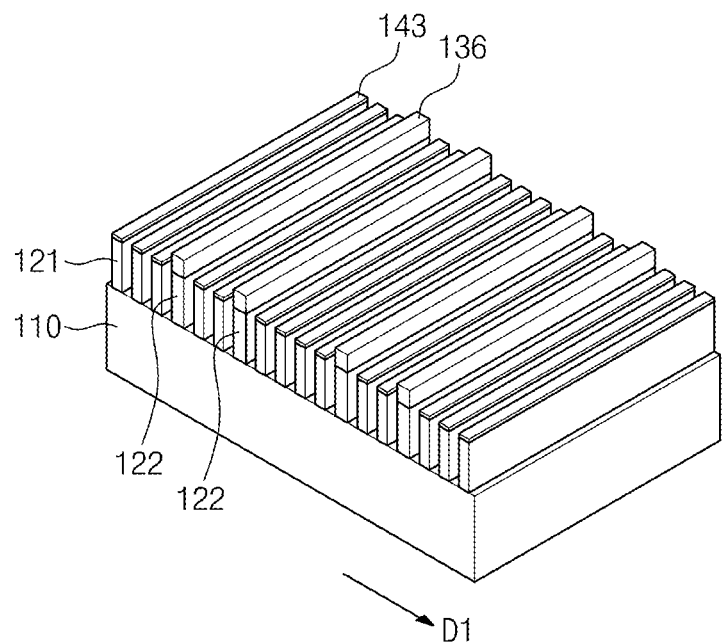

Referring to FIG. 3K, residuals of the nano grid patterns 143 and the barriers 136 may remain as top portions of the first metallic nano wires 121 and the second metallic nano wires 122, respectively. Subsequently, the residuals may be substantially removed through a residual etching process.

Figure 3L:
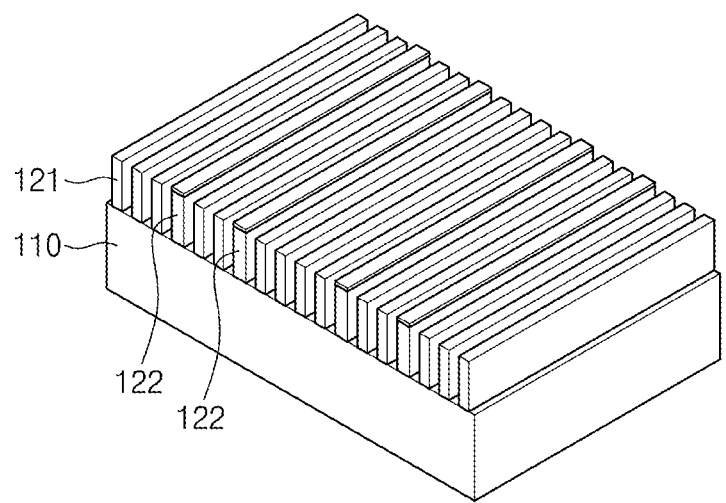

Since the height of (the residuals of) the barriers 136 is relatively higher than the height of (the residuals of) the nano grid patterns 143, after the residual etching process, the nano grid patterns 143 may be substantially completely removed, and portions of the residuals of the barriers 136 may remain as the top portions of the second metallic nano wires 122, as shown in FIG. 3L.

FIGS. 4A to 4M are perspective views illustrating a process of manufacturing a reflective polarizer according to an embodiment of the invention.

Figure 4A:
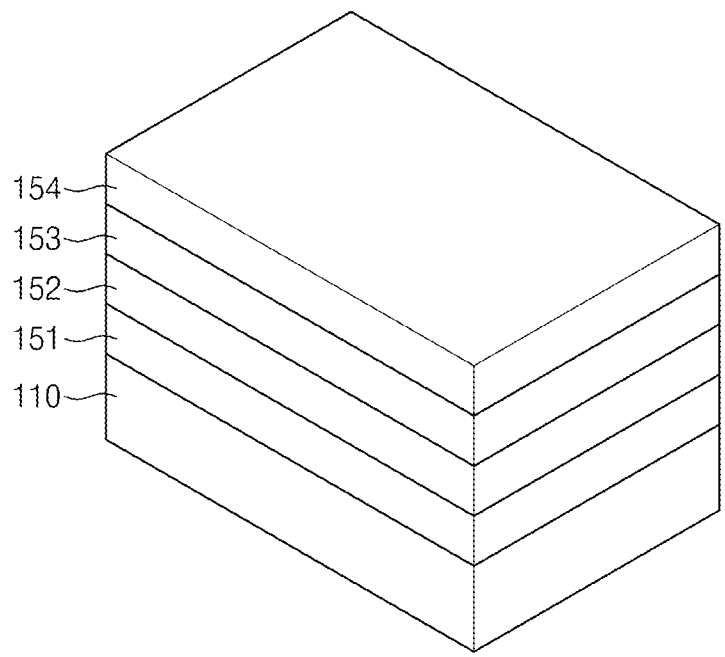
FIGS. 4A to 4M are perspective views illustrating a process of manufacturing a reflective polarizer according to an embodiment of the present invention.

Referring to FIG. 4A, a metal layer 151, a first barrier layer 152, a hard mask layer 153, and a sacrificial layer 154 are sequentially deposited on a transparent substrate 110. Before forming the first barrier layer 152, a capping layer (not shown) may be formed on the metal layer 151. The capping layer may be formed of titanium (Ti) and/or molybdenum (Mo).

Figure 4B:
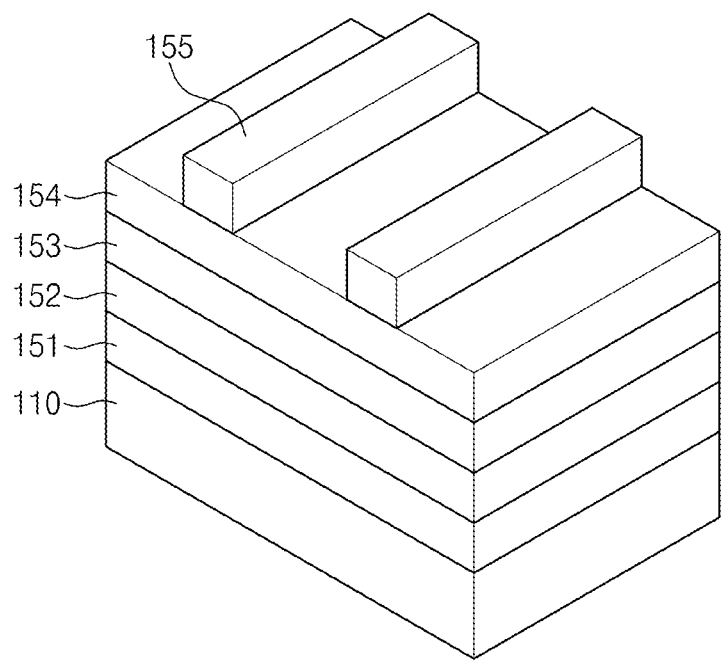
Figure 4C:
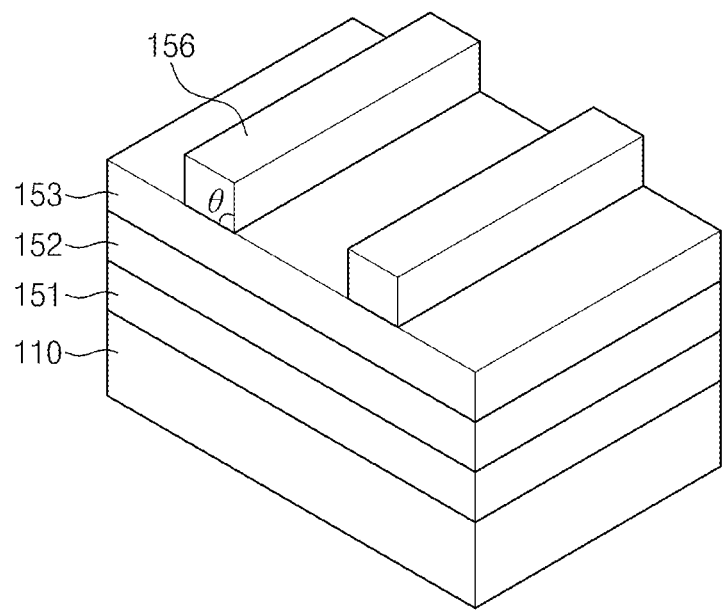

Referring to FIG. 4B, a photo mask 155 is formed on the sacrificial layer 154. Bar patterns 156 are formed by dry etching and removing portions of the sacrificial layer 154 that are not covered by the photo mask 155. After that, when removing the photo mask 155, as shown in FIG. 4C, only the bar patterns 156 remain on the hard mask layer 153.

Inclinations θ of sidewalls of the respective bar patterns 156 with respect to a top surface of the hard mask layer 153 may be in a range from about 85 to about 95 degrees.

Figure 4D:
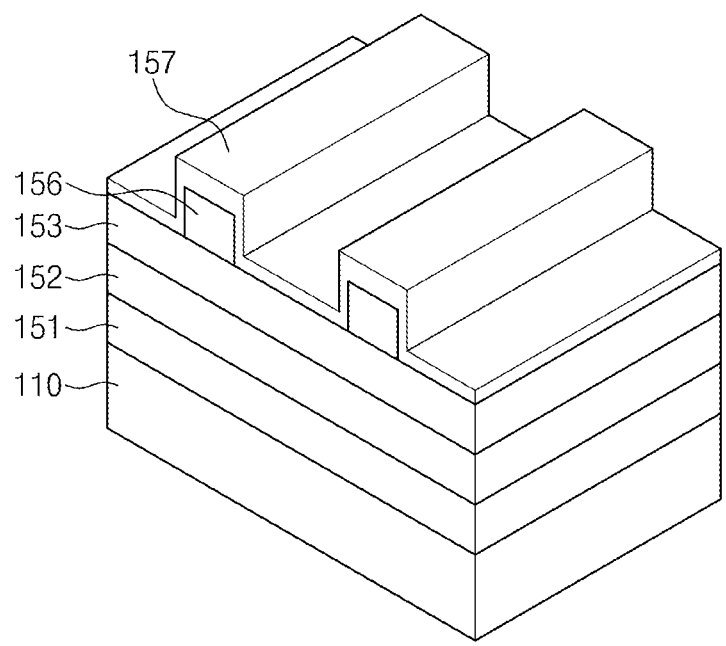
Figure 4E:
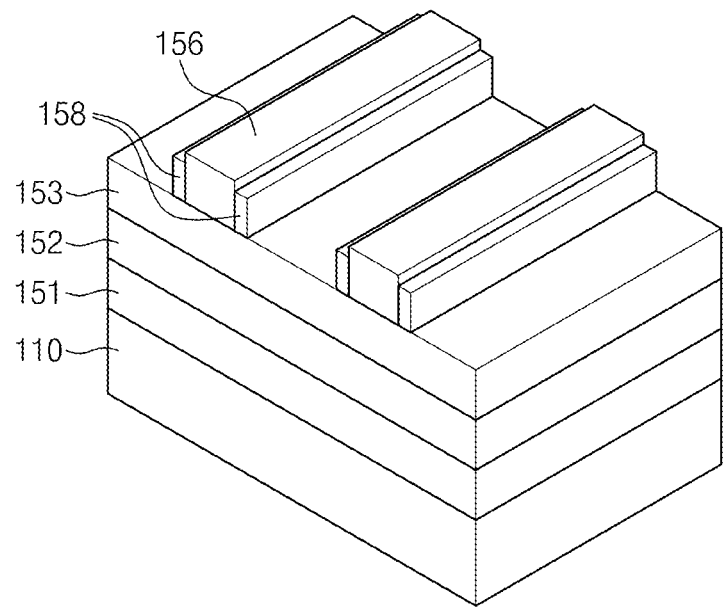

Referring to FIG. 4D, a second barrier layer 157 is formed on the hard mask layer 153 to cover the bar patterns 156. After anisotropic etching is performed on the second barrier layer 157, as shown in FIG. 4E, first-type barrier 158 (or first barriers 158, for conciseness) are formed along the sidewalls of the bar patterns 156 and are mutually separated with a certain interval.

The anisotropic etching may be performed in a direction substantially perpendicular to the top surface of the transparent substrate 110. Accordingly, portions of the second barrier layer 157 that are parallel to the top surface of the transparent substrate 110 may be substantially removed by the anisotropic etching, and portions of the second barrier layer 157 that are perpendicular to the top surface of the transparent substrate 110 may remain after the anisotropic etching.

Accordingly, the first barriers 158 may be formed along the sidewalls of the bar patterns 156.

In an etchant used for the anisotropic etching, an etch rate of the material of the sacrificial layer 154 may be substantially lower than an etch rate of the material of the second barrier layer 157. The etch rate of the material of the sacrificial layer 154 may be no more than a half of the etch rate of the material of the second barrier layer 157. In an embodiment, the sacrificial layer 154 may be formed of silicon nitride, and the second barrier layer 157 may be formed of silicon oxide. During the anisotropic etching performed on the second barrier layer 157, the bar patterns 156 (formed from the sacrificial layer 154) may not be substantially etched but may substantially remain.

Figure 4F:
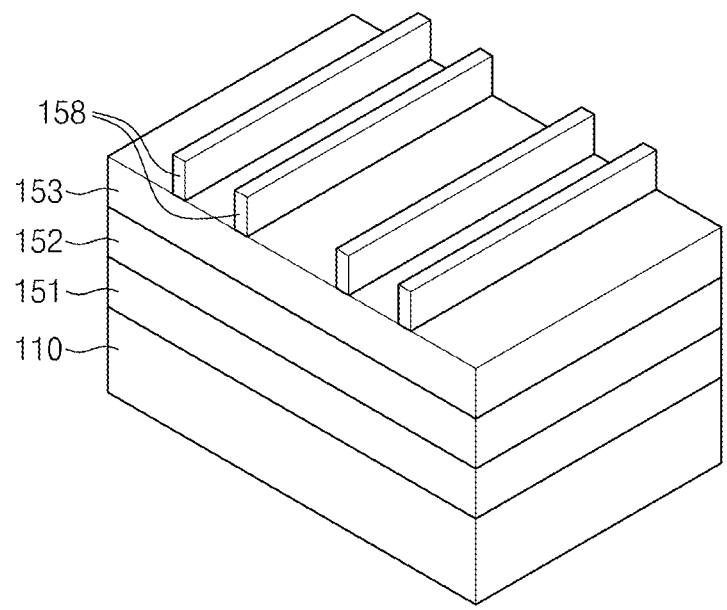

Subsequently, the bar patterns 156 may be etched and removed. As a result, as shown in FIG. 4F, only the first barriers 158, mutually separated with a certain interval, may remain on the hard mask layer 153. In an embodiment, each of the first barriers 158 may have a width that is in a range from about 80 nm to about 200 nm.

The sacrificial layer 154 and the second barrier layer 157 may be formed of materials having etching characteristics (e.g., etch rates) that are different from etching characteristics of the hard mask layer 153. The hard mask layer 153 may not be substantially etched when the bar patterns 156 and the second barrier layer 157 are etched.

Figure 4G:
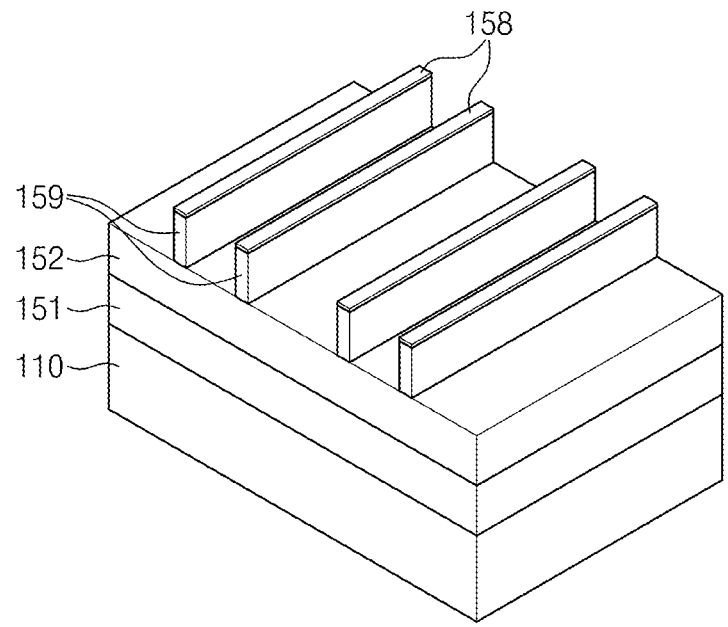

Subsequently, the hard mask layer 153 may be etched using the first barriers 158 as a mask. As a result, as shown in FIG. 4G, second-type barriers (or second barriers 159, for conciseness) are formed on the first barrier layer 152. The second barriers 159 are formed at locations that correspond to the first barriers 158. The first barriers 158 may be partially removed when the hard mask layer 153 is etched. Remaining portions of the first barriers 158 may overlap the second barriers 159.

The hard mask layer 153 may be formed of a set of materials having low etch rates in comparison with the first barrier layer 152. In an embodiment, the hard mask layer 153 may be formed of aluminum, and the first barrier layer 152 may be formed of silicon nitride.

Figure 4H:
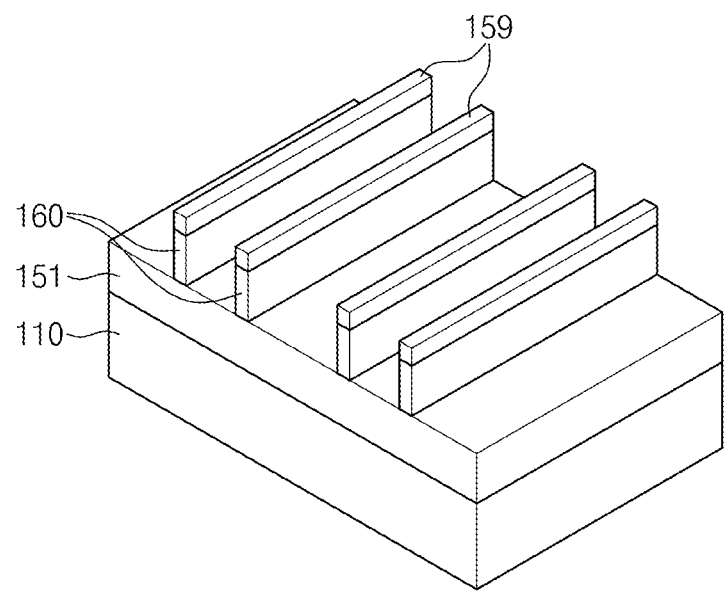

Subsequently, referring to FIG. 4H, third-type barriers 160 (or third barriers 160, for conciseness) are formed by etching the first barrier layer 152 using the second barriers 159 as a mask. The third barriers 160 are at locations that correspond to the second barriers 159. When the first barrier layer 152 is etched, the second barriers 159 are partially removed, such that a height of the second barriers 159 remaining on the third barriers 160 may be reduced.

Figure 4I:
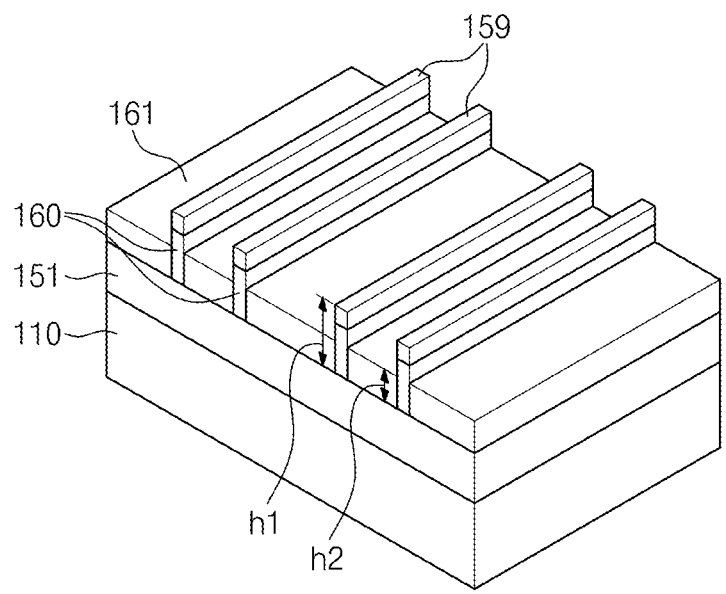

Referring to FIG. 4I, spaces between the third barriers 160 are filled with a copolymer layer 161. The copolymer layer 161 may be formed to have a height h2 smaller than a barrier height h1 that is equal to a height of a third barrier 160 and a height of a second barrier 159 remaining on the third barrier 160. The copolymer layer 161 may include a first-type polymer material and a second-type polymer material that are irregularly mixed in chaotic directions. The first polymer may be PS; the second polymer material may be PMMA.

Figure 4J:
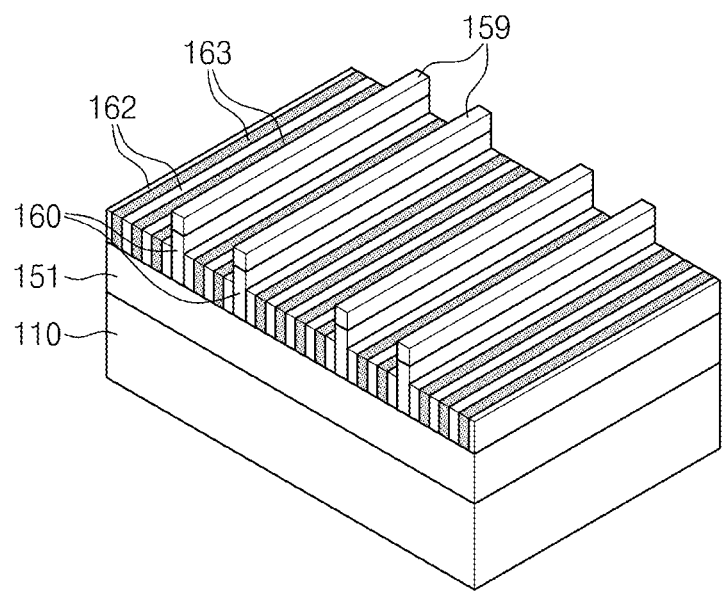

After the copolymer layer 161 has been thermally treated, as shown in FIG. 4J, the copolymer layer 161 are phase-separated into first-type polymer portions 162 (or first polymer portions 162, for conciseness) and second-type polymer portions 163 (or second polymer portions 163, for conciseness). Particularly, some first polymer portions 162 and some second polymer portions 163 may be alternately arranged between each pair of two third barriers 160.

Figure 4K:
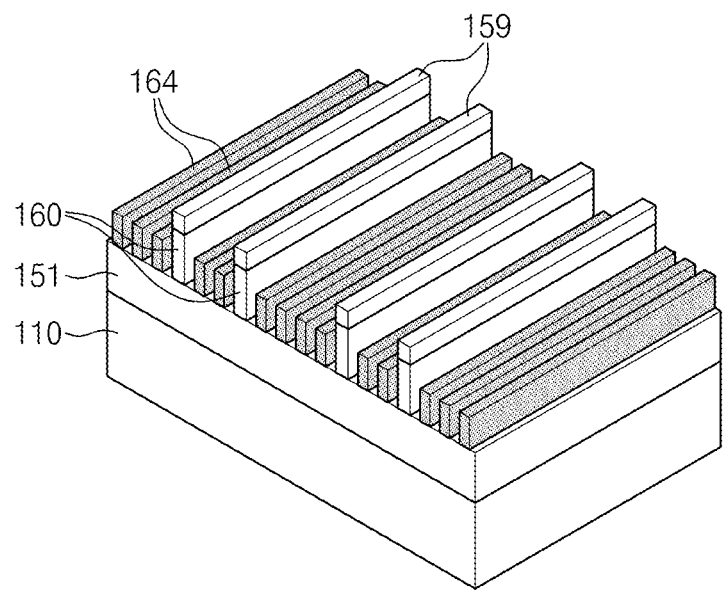

Subsequently, the first polymer portions 162 or the second polymer portions 163 are removed, and the remaining polymer portions (which are separated with a certain interval) form nano grid patterns 164 that are spaced from each other, as shown in FIG. 4K.

Figure 4L:
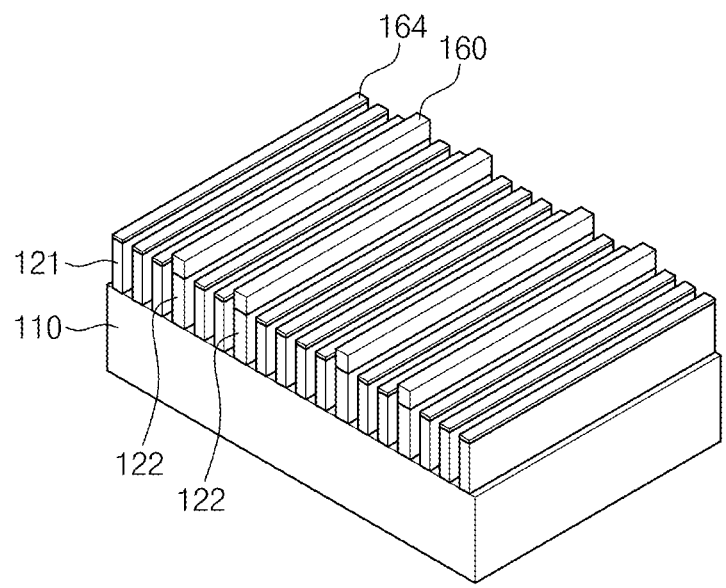

Subsequently, the metal layer 151 is etched using the nano grid patterns 164 and the third barriers 160 as a mask. As a result, as shown in FIG. 4L, metallic nano wires 121 and 122 are arranged in the first direction D1 and are provided on the transparent substrate 110.

Figure 4M:
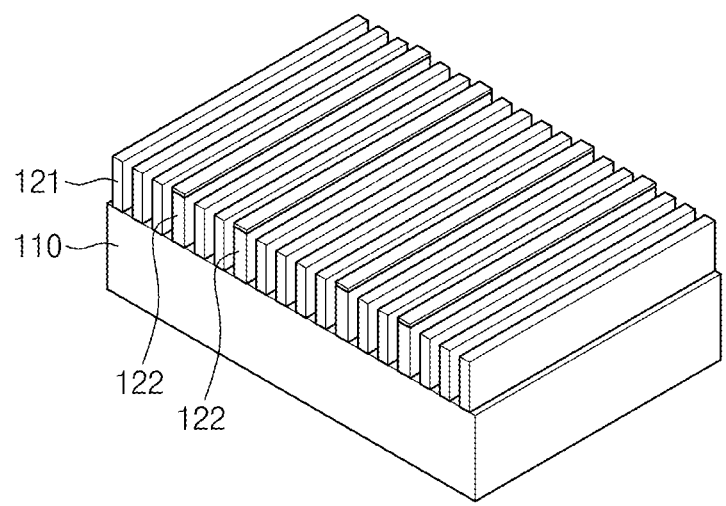

Referring to FIG. 4M, residuals of the nano grid patterns 164 and the third barriers 160 may remain on top surfaces of the first metallic nano wires 121 and the second metallic nano wires 122, respectively. The residuals may be removed through an etching process.

Since the height of (the residuals of) the third barriers 160 is relatively higher than the height of (the residuals of) the nano grid patterns 164, after the residual etching process, the nano grid patterns 143 may be substantially completely removed, and portions of the residuals of the third barriers 160 may remain as the top portions of the second metallic nano wire 122, as shown in FIG. 4M.

Figure 5:
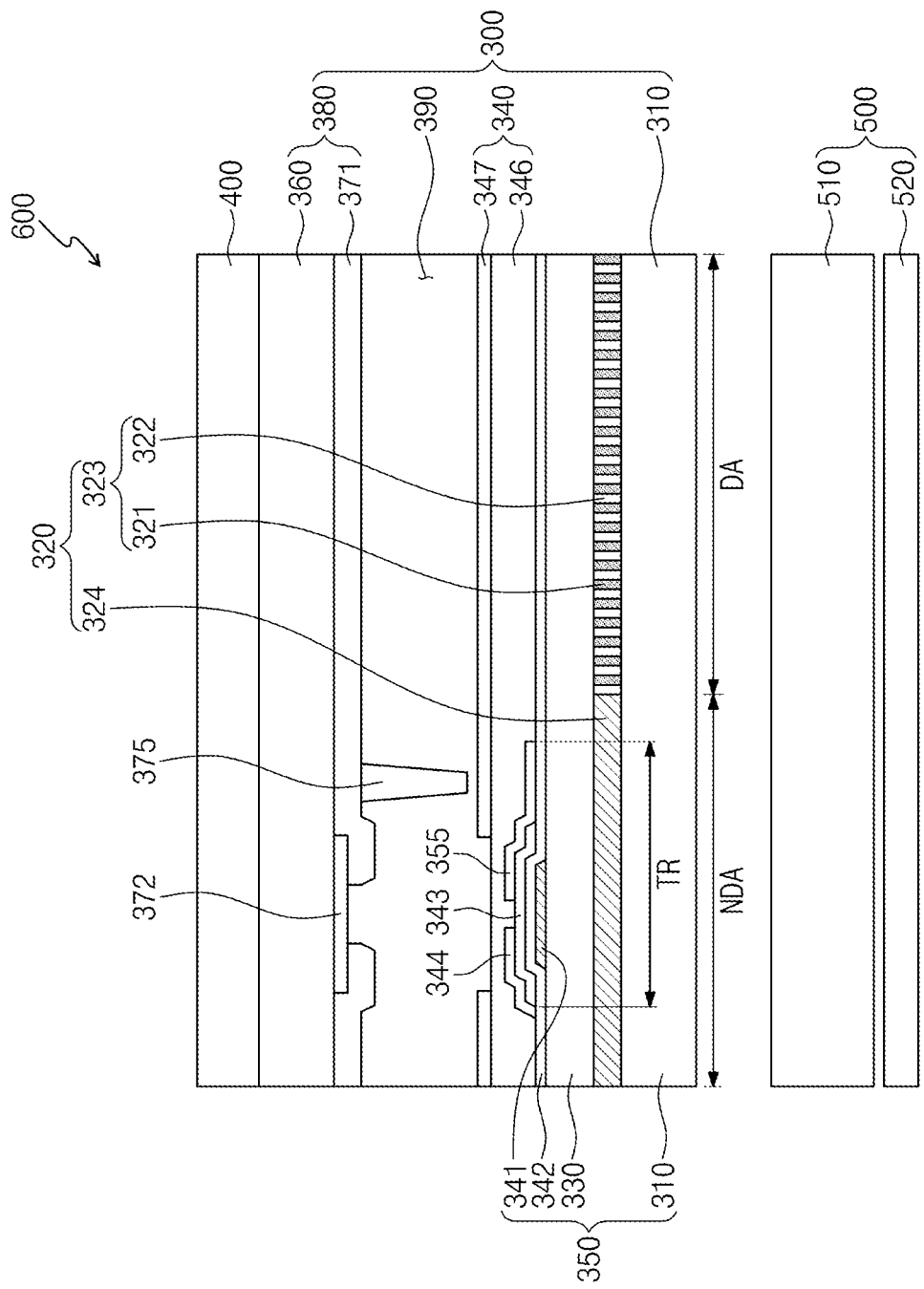
FIG. 5 is a cross-sectional view illustrating a display apparatus including an in-cell reflective polarizer according to an embodiment of the present invention.

FIG. 5 is a cross-sectional view illustrating a display apparatus 600 including an in-cell reflective polarizer 320 according to an embodiment of the invention.

Referring to FIG. 5, the display apparatus 600 includes a backlight unit 500 for generating light and includes a display panel 300 for displaying images using the light.

The backlight unit 500 includes a light source (not shown) for generating light, a light guide plate 510 for receiving the light from the light source and for guiding the light toward the display panel 300. The backlight unit 300 further includes a reflecting plate 520 for reflecting light leaked from the light guide plate 510 toward the light guide plate 510.

The backlight unit 500 is adjacent to a bottom surface of the display panel 300. The light guide plate 510 may have a size corresponding to the display panel 300 and may output the light through a front surface. The reflective plate 520 may have a size corresponding to a bottom surface of the light guide plate 510, may be formed of a material having high reflectance, and may reflect light leaked through the bottom surface of the light guide plate 510 back to the light guide plate 510.

The display panel 300 includes a first substrate 350, a second substrate 380 overlapping the first substrate 350, and a liquid crystal layer 390 disposed between the first substrate 350 and the second substrate 380.

The first substrate 350 includes a first transparent substrate 310, an in-cell reflective polarizer 320, a base insulating film 330 covering the in-cell reflective polarizer 320, and a pixel array layer 340 provided on the base insulating layer 330.

The display panel 300 includes a display area DA and a non-display NDA. The in-cell reflective polarizer 320 includes a polarizing part 323 provided on the first transparent substrate 310 and corresponding to the display area DA; the in-cell reflective polarizer 320 further includes a reflective part 324 provided on the first transparent substrate 310 and corresponding to the non-display area NDA.

The polarizing part 323 includes a plurality of metallic nano wires 321 and a plurality of metallic nano wires 322. The metallic nano wires 321 and 322 reflect an S wave, which is a component of the light provided from the backlight unit 500 that is parallel to an extension direction of the metallic nano wires 321 and 322, and transmit a P wave, which is a component of the light provided from the backlight unit 500 that is orthogonal to the extension direction of the metallic nano wires 321 and 322.

The reflective part 324 is formed of a material, such as aluminum, having high reflectance and may reflect the light provided from the backlight unit 500. The light reflected by the reflective part 324 may be substantially reflected by the reflective plate 520 of the backlight unit 500 back to the display panel 300 again. Accordingly, light and/or associated energy may be substantially efficiently utilized.

The base insulating film 330 is formed on the top surface of the in-cell reflective polarizer 320. The base insulating film 330 may substantially cover the reflective part 324 and the polarizing part 323.

The pixel array layer 340 is formed on the base insulating film 330. The base insulating film 330 is formed of an insulating material to electrically insulate the reflective part 324 and the polarizing part 323 from the pixel array layer 340.

The pixel array layer 340 may include a thin film transistor TR, an interlayer dielectric 346, and a pixel electrode 347. The thin film transistor TR includes a gate electrode 341, a source electrode 344, and a drain electrode 355. The gate electrode 341 is formed on the base insulating film 330 and is covered by a gate insulating layer 342. A semiconductor layer 343 is formed on the gate insulating layer 342 and overlaps the gate electrode 341. The source electrode 344 and the drain electrode 355 are arranged on the semiconductor layer 343 and are separated from each other by a certain interval.

The interlayer dielectric 346 is formed on the gate insulating layer 342 to cover the thin film transistor TR. The pixel electrode 347 is formed on the interlayer dielectric 346.

The structure of the first substrate 350 illustrated in FIG. 5 is provided as an example. Embodiments of the invention are not limited to the structure illustrated in FIG. 5.

The second substrate 380 includes a second transparent substrate 360, a color filter layer 371, and a black matrix 372. The second transparent substrate 360 overlaps the first transparent substrate 310 with the aforementioned elements 320, 330, 340, etc. being disposed between the first transparent substrate 310 and the second transparent substrate 360. The black matrix 372 is provided on the second transparent substrate 360 and corresponds to the non-display area NDA. The color filter layer 371 includes red, green, and blue color filters. The color filters may correspond to at least the display area DA and may overlap the black matrix 372.

Between the first substrate 350 and the second substrate 380, the liquid crystal layer 390 is provided. The display panel 300 may further include a spacer 375 for separating the first substrate 350 from the second substrate 380 to provide a space for forming the liquid crystal layer 390 between the substrates 350 and 360.

A dichroic polarizer 400 is provided on the display panel 300. The dichroic polarizer 400 is formed as a sheet shape and may be attached to the display panel 300. A polarization axis of the dichroic polarizer 400 may be perpendicular or parallel to the extension direction of the metallic nano wires 321 and 322 of the in-cell reflective polarizer 320.

FIGS. 6A to 6D are perspective views illustrating a process of manufacturing the in-cell reflective polarizer 320 according to an embodiment of the present invention.

Figure 6A:
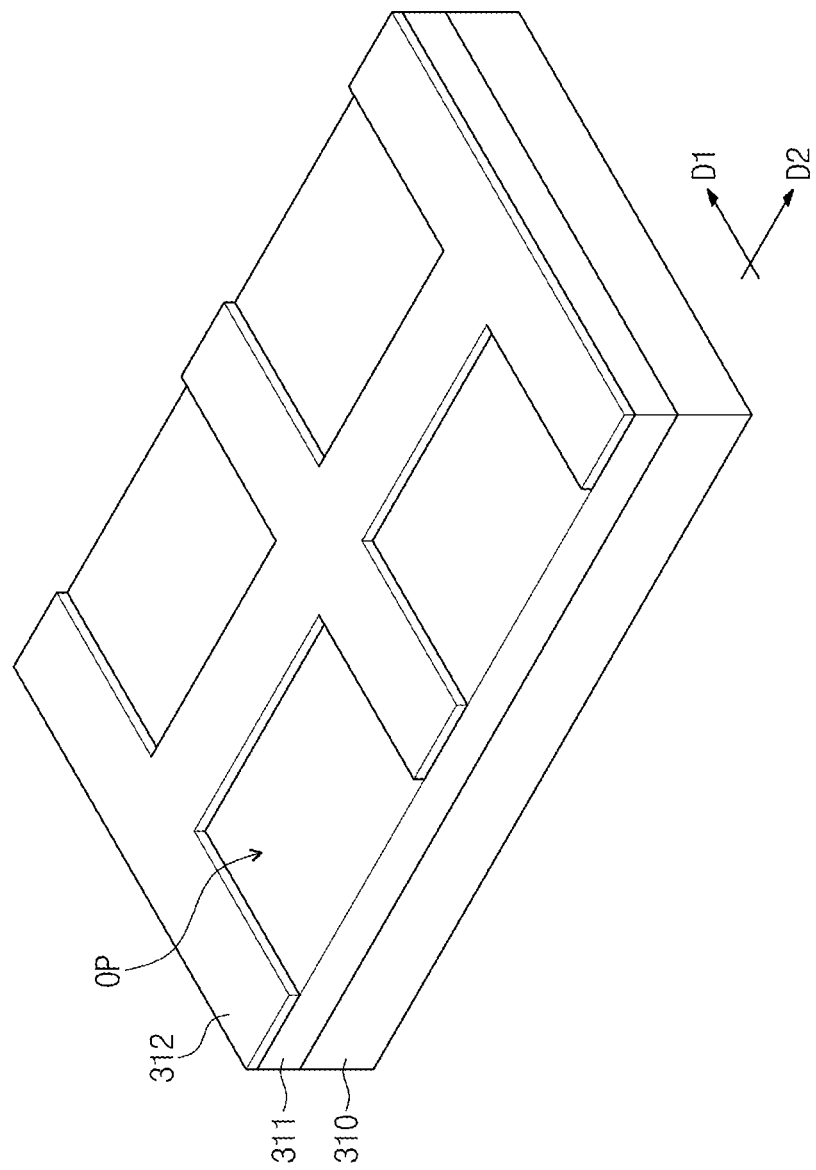
FIGS. 6A to 6D are perspective views illustrating a process of manufacturing the in-cell reflective polarizer of FIG. 5 according to an embodiment of the present invention.

Referring to FIG. 6A, a metal layer 311 is formed on a top surface of the first transparent substrate 310. As an example, the metal layer 311 may be formed of aluminum (Al). An etch stop layer 312 is formed on the metal layer 311. The etch stop layer 312 may correspond to the non-display area NDA of the display panel 300 and may have an opening OP that corresponds to the display area DA. The etch stop layer 312 may be formed of chrome or indium tin oxide.

Figure 6B:
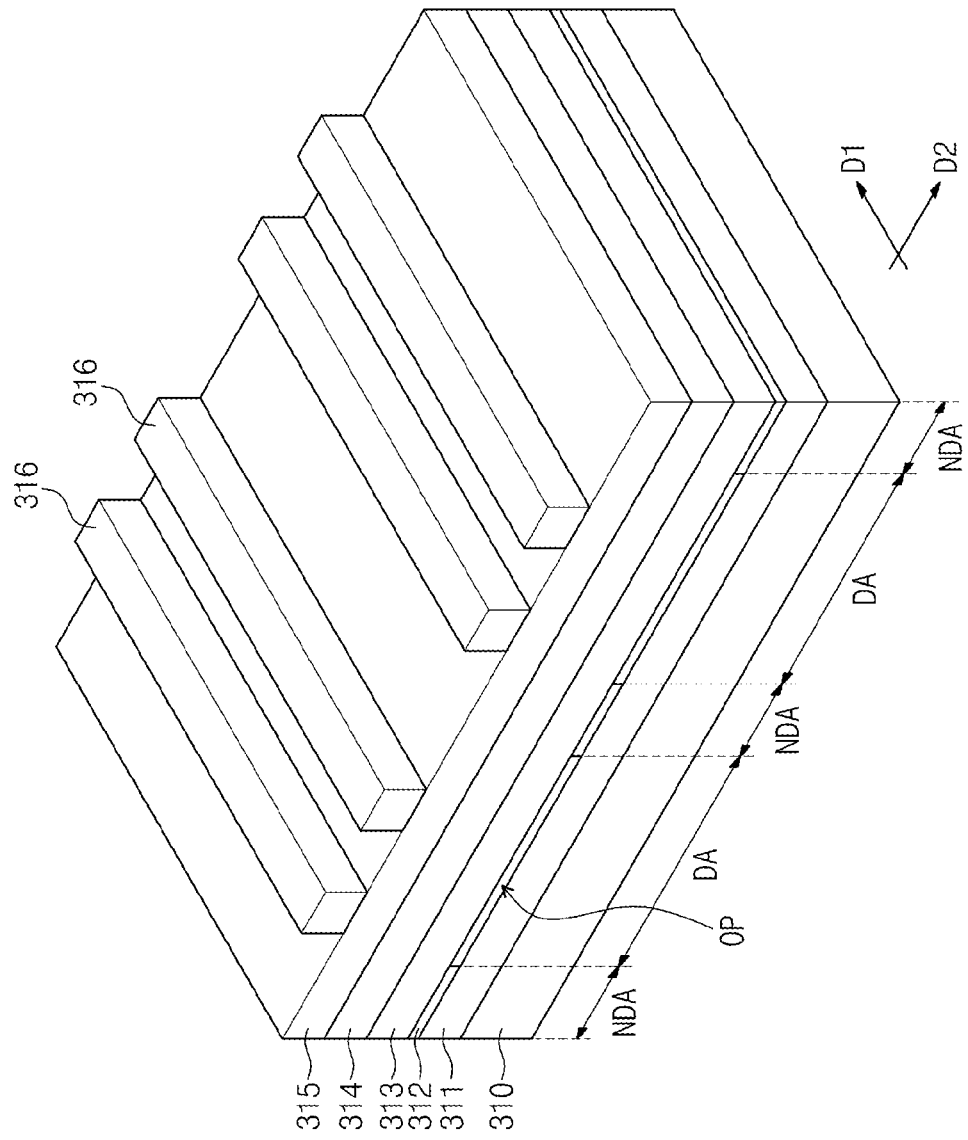

As shown in FIG. 6B, a first barrier layer 313, a hard mask layer 314, and a sacrificial layer 315 may be sequentially deposited on the etch stop layer 312 and a portion of the metal layer 311 exposed through the opening OP. A photo mask 316 is provided on the sacrificial layer 315. As an example, the photo mask 316 may extend in a direction parallel to two among four edges of the first transparent substrate 310, the two edges being parallel to each other.

Operation steps from patterning the sacrificial layer 315 using the photo mask 316 to forming third-type barriers (or third barriers 317, for conciseness, illustrated in FIG. 6C) may be substantially analogous to the steps discussed with reference to FIGS. 4B to 4G. Repetitive description may be omitted.

Figure 6C:
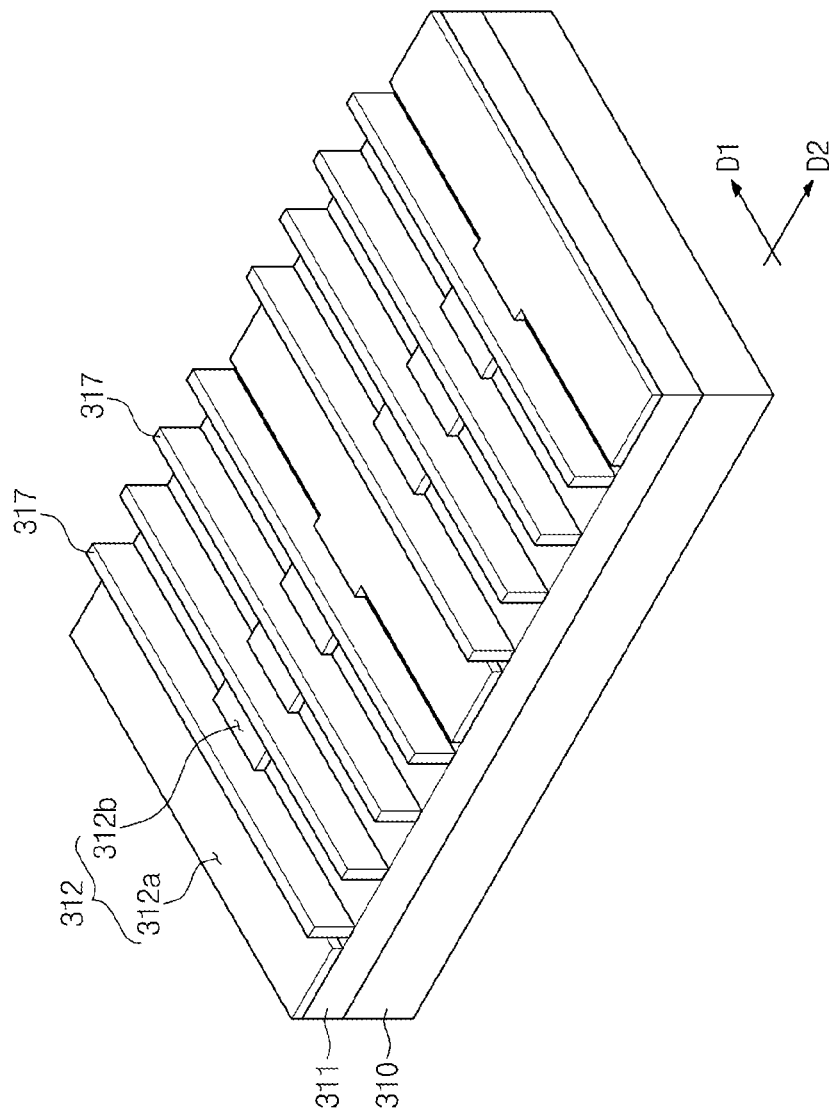

Referring to FIG. 6C, the etch stop layer 312 and the third barriers 317 are formed on the metal layer 311. The third barriers 317 may extend in the first direction D1. The etch stop layer 312 includes vertical parts 312a extended in the first direction D1 and horizontal parts 312b extended in the second direction D2. The vertical parts 312a are separated from the most adjacent third barriers 317 (and/or immediately neighboring third barriers 317) by certain intervals. The horizontal parts 312b are provided between vertical parts 312a and intersect the third barriers 317.

The etch stop layer 312 may be formed of a material having an etch rate that is substantially lower than an etch rate of the first barrier layer 313 and not be substantially etched when the first barrier layer 313 is etched.

Although not shown in the drawings, a process of forming nano grid patterns by forming a copolymer layer between the third barriers 317 may be substantially analogous to the process discussed with reference to FIGS. 4I to 4K. Accordingly, repetitive description thereof may be omitted.

Figure 6D:
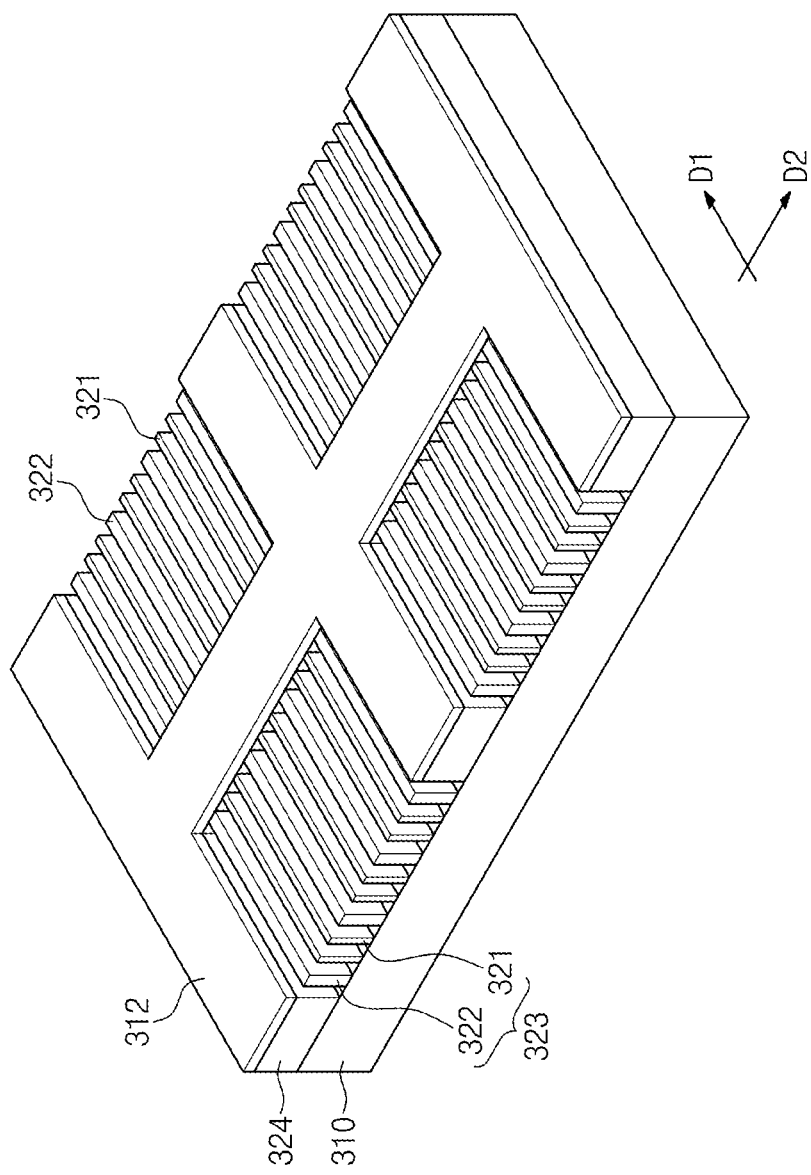

Subsequently, after the metal layer 311 has been etched using the third barriers 317 and the nano grid patterns as a mask, as shown in FIG. 6D, the metallic nano wires 321 and 322 are formed in an area that corresponds to the opening OP. The first metallic nano wires 321 may correspond to the nano grid patterns, and the second metallic nano wires 322 may correspond to the third barriers 317.

On the other hand, portions of the metal layer 311 that are covered by the etch stop layer 312 may not be substantially etched during the etch process. Accordingly, the residual portions of the metal layer 311 may form the reflective part 324 of the in-cell reflective polarizer 320. The polarizing part 323, which includes the metallic nano wires 321 and 322 may correspond to the opening OP.

Figure 7A:
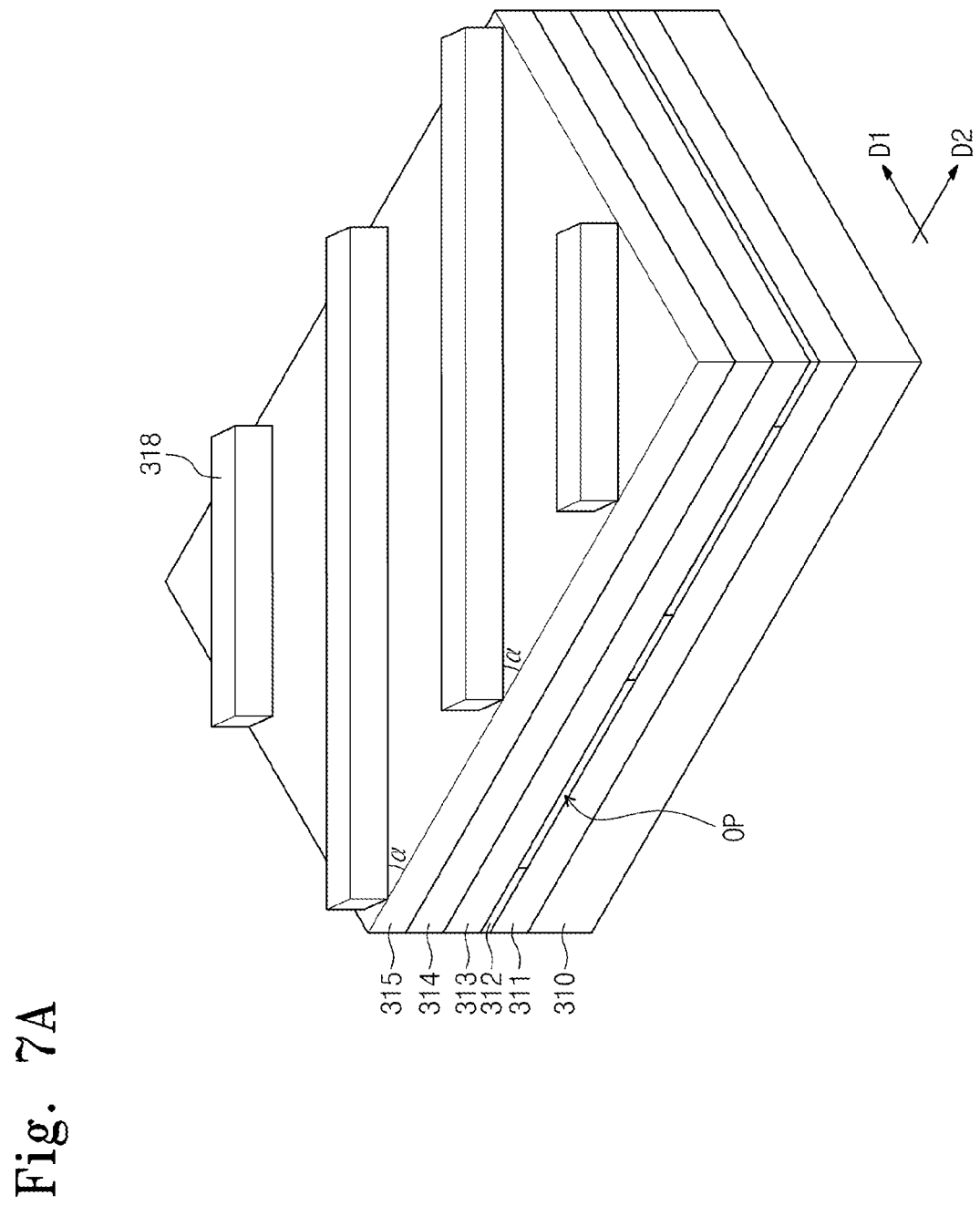
FIGS. 7A and 7B are perspective views illustrating a process of manufacturing an in-cell reflective polarizer according to an embodiment of the present invention.
Figure 7B:
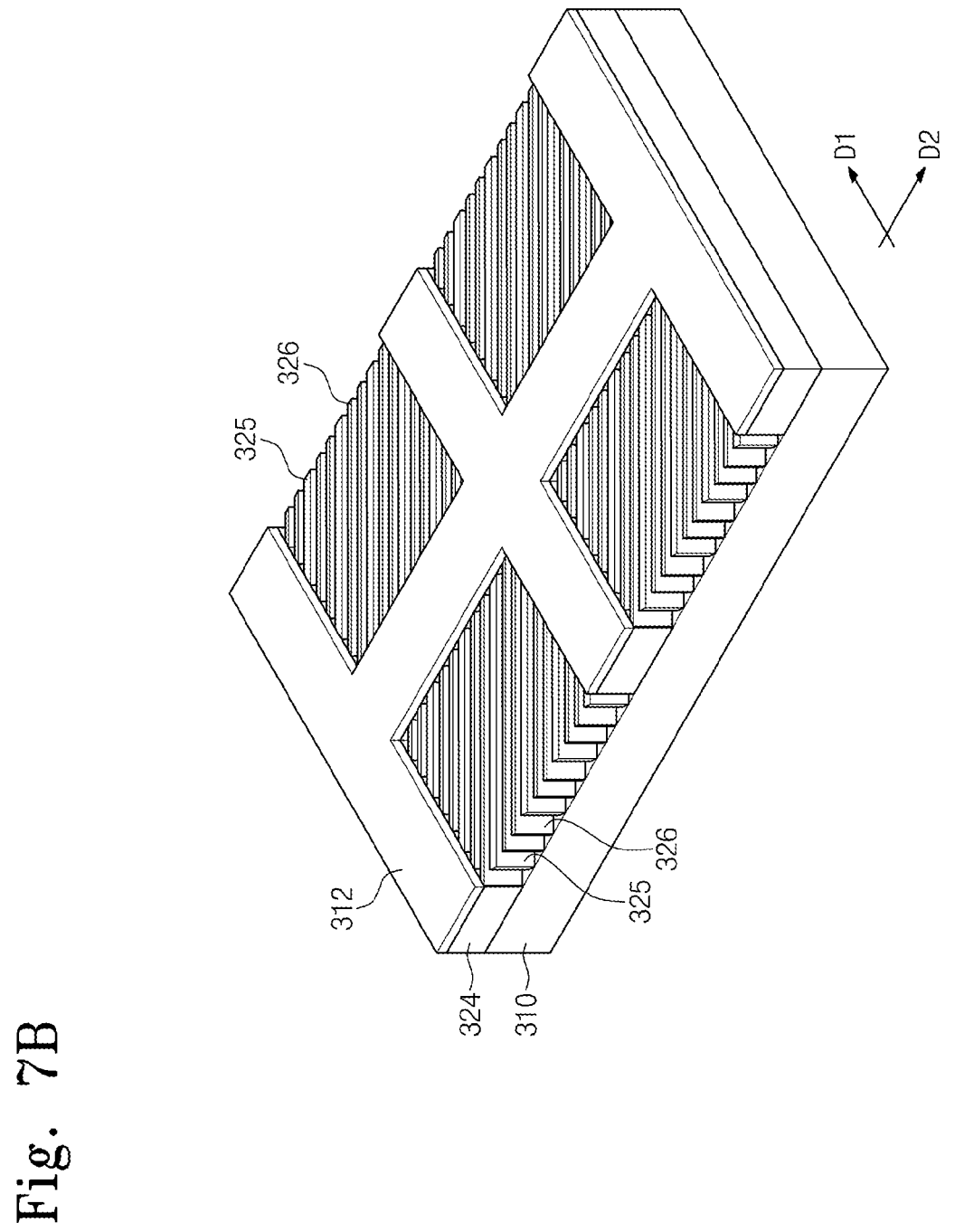

FIGS. 7A and 7B are perspective views illustrating a process of manufacturing an in-cell reflective polarizing plate according to an embodiment of the invention. Some features of elements and/or steps illustrated in FIGS. 7A and 7B may be substantially analogous to or identical to some elements and/or steps discussed with reference to FIGS. 6A to 6D. Repetitive description may be omitted.

As shown in FIG. 7A, a first barrier layer 313, a hard mask layer 314, and a sacrificial layer 315 may be sequentially deposited on the etch stop layer 312 and the metal layer 311.

The etch stop layer 312 may correspond to the non-display area NDA of the display panel 300 and may have an opening OP that corresponds to the display area DA.

A photo mask 318 is provided on the sacrificial layer 315. According to an embodiment, the photo mask 318 may extend in a direction that is at a certain angle α, for example, 45 degrees with respect to an edge of the first transparent substrate 310 in a plan view of the structure illustrated in FIG. 7A.

Some subsequent process steps may be substantially analogous to process steps discussed with reference to FIGS. 4C to 4M. Repetitive description may be omitted.

Referring to FIG. 7B, a plurality metallic nano wires 325 and a plurality metallic nano wires 326 are formed in an area that corresponds to the opening OP. The metallic nano wires 325 and 326 extend in a direction parallel to the photo mask 318. In an embodiment, the metallic nano wires 325 and 326 may extend in a direction that is at 45 degrees with respect to an edge of the first transparent substrate 310 in a plan view of the in-cell reflective polarizer 320. A tilt angle of the metallic nano wires 325 and 326 may be changed according to the type of the liquid crystal layer LC and the driving mode of the display device. For example, the polarization axis of the dichroic polarizer 400 may be perpendicular or parallel to the extension direction of the metallic nano wires 325 and 326 of the in-cell reflective polarizer 320.

The dichroic polarizer 400 shown in FIG. 5 may have a polarization axis that is orthogonal or parallel to the metallic nano wires 325 and 326 shown in FIG. 7B.

The reflective part 324 corresponding to the non-display area NDA is formed using the etch stop layer 312. The reflective part 324 may facilitate reuse of light provided from the backlight unit 500.

According to embodiments of the present invention, a width of a first metallic nano wire 121 may be substantially equal to a width of a nano grid pattern that is formed using a self-arrangement process of a copolymer layer, and a width of a second metallic nano wire 122 may be substantially equal to a width of a barrier, which is a thickness of a layer of material formed on a bar pattern. Accordingly, both the width of the first metallic nano wire 121 and the width of the second metallic nano wire 122 may be minimized. In an embodiment, the second metallic nano wire 122 may have a width smaller than two times a width of the first metallic nano wire 121. Advantageously, an aperture ratio of a reflective polarizer that includes the metallic nano wires may be maximized.

The above-disclosed subject matter is to be considered illustrative and not restrictive. The appended claims are intended to cover all such modifications, enhancements, and other embodiments, which fall within the true spirit and scope of the invention. The scope of the invention is to be determined based on the broadest permissible interpretation of the following claims and their equivalents, and shall not be restricted or limited by the foregoing detailed description.

What is claimed is:

1. A method of manufacturing a polarizer, comprising:
   forming a metal layer on a top surface of a substrate;
   forming a sacrificial layer on the metal layer;
   forming bar patterns by patterning the sacrificial layer;
   forming a barrier layer on the bar patterns and the metal layer;
   forming barriers along sidewalls of the bar patterns and mutually separated with a certain interval by performing anisotropic etching on the barrier layer;
   removing the bar patterns;
   providing a copolymer layer formed of first and second polymers in an opening between the barriers;
   alternately arranging the first and second polymers by thermally treating the copolymer layer;
   forming a plurality of nano grid patterns formed of the first polymer and mutually separated with a certain interval between the barriers by removing the second polymer of the first and second polymers, wherein each of the barriers is taller than the plurality of nano grid patterns; and
   forming metallic nano wires by etching the metal layer using the barriers and the nano grid patterns as a mask, wherein the metallic nano wires include a first metallic nano wire and a second metallic nano wire, and wherein the second metallic nano wire includes a portion of a barrier of the barriers and is taller than the first metallic nano wire by a thickness of the portion of the barrier of the barriers.

2. The method of claim 1, wherein the sacrificial layer and the barrier layer are formed of materials having different etching selectivities from that of the metal layer.

3. The method of claim 1, wherein an etching selectivity of the sacrificial layer is higher than that of the barrier layer.

4. The method of claim 3, wherein the sacrificial layer is silicon nitride and the barrier layer is silicon oxide.

5. The method of claim 1, wherein a height of the barriers is higher than that of the copolymer layer.

6. The method of claim 1, wherein inclinations of the sidewalls of the bar patterns are present within a range from about 85 to about 95 degrees.

7. The method of claim 1, wherein the anisotropic etching is performed in a direction substantially perpendicular to the top surface of the substrate.

8. The method of claim 1, wherein the first metallic nano wire includes a portion of the first polymer, and wherein a residual of the barriers is thicker than the portion of the first polymer.

9. A method of manufacturing a polarizer, comprising:
  forming a metal layer on a top surface of a substrate;
  forming a first barrier layer on the metal layer;
  forming a hard mask on the first barrier layer;
  forming a sacrificial layer on the hard mask layer;
  forming bar patterns by patterning the sacrificial layer;
  forming a second barrier layer on the bar patterns and the hard mask layer;
  forming first barriers along sidewalls of the bar patterns and mutually separated with a certain interval by performing anisotropic etching on the second barrier layer;
  removing the bar patterns;
  forming second barriers by etching the hard mask layer by using the first barriers as a mask;
  forming third barriers by etching the second barrier layer by using the second barriers as a mask;
  providing a copolymer layer formed of first and second polymers in an opening between the third barriers;
  alternately arranging the first and second polymers by thermally treating the copolymer layer;
  forming a plurality of nano grid patterns formed of the first polymer and mutually separated with a certain interval between the third barriers by removing the second polymer of the first and second polymers; and
  forming metallic nano wires by etching the metal layer by using the third barriers and the nano grid patterns as a mask.

10. The method of claim 9, wherein the sacrificial layer and the first barrier layer are formed of materials having different etching selectivities from that of the hard mask layer.

11. The method of claim 9, wherein the etching selectivity of the sacrificial layer is higher than that of the first barrier layer, and
  wherein an etching selectivity of the hard mask layer is higher than that of the second barrier layer.

12. The method of claim 11, wherein the sacrificial layer is formed of silicon nitride, the first barrier layer is formed of silicon oxide, the hard mask layer is formed of aluminum, and the second barrier layer is formed of silicon nitride.

13. The method of claim 9, further comprising, before the forming of the first barrier layer, forming a capping layer on the metal layer.

14. The method of claim 13, wherein the capping layer is formed of one of Ti and Mo.

15. The method of claim 9, wherein a height of the third barriers is higher than that of the copolymer layer.

16. The method of claim 9, wherein inclinations of the sidewalls of the bar patterns are present within a range from about 83 to about 95 degrees.

17. The method of claim 9, wherein the anisotropic etching is performed in a direction substantially perpendicular to the top surface of the substrate.

18. A method of manufacturing a polarizer, the method comprising:
  forming a metal layer on a top surface of a substrate;
  forming an etch stop layer on the metal layer, wherein the etch stop layer directly contacts a reflective portion of the metal layer and exposes a polarization portion of the metal layer, wherein the reflective portion of the metal layer corresponds to a non-display area of a display panel, and wherein the polarization portion of the metal layer corresponds to a display area of the display panel;
  forming a sacrificial layer on the etch stop layer and the metal layer;
  forming bar patterns by patterning the sacrificial layer;
  forming a barrier layer on the bar patterns and the metal layer;
  forming barriers along sidewalls of the bar patterns and mutually separated with an interval by performing anisotropic etching on the barrier layer;
  removing the bar patterns;
  providing a copolymer layer formed of first and second polymers in an opening between the barriers;
  alternately arranging the first and second polymers by thermally treating the copolymer layer;
  forming a plurality of nano grid patterns formed of the first polymers and mutually separated with a certain interval between the barriers by removing the second polymers of the first and second polymers, wherein each of the barriers is taller than the plurality of nano grid patterns; and
  forming metallic nano wires in the display area by etching the metal layer using the barriers and the nano grid patterns as a mask, wherein the metallic nano wires include a first metallic nano wire and a second metallic nano wire, and wherein the second nano wire includes a portion of a barrier of the barriers and is taller than the first nano wire because of at least the portion of the barrier of the barriers.

19. The method of claim 18, wherein the etch stop layer is formed of one of chrome and indium tin oxide, wherein the nano wires have a width greater than 0 nm and 200 nm or smaller, and wherein an etching selectivity of the etch stop layer is higher than that of the barrier layer.

* * * * *